United States Patent
Hildebrand et al.

(10) Patent No.: US 8,505,064 B2
(45) Date of Patent: Aug. 6, 2013

(54) METHOD AND SYSTEM OF PROVIDING SIGNALS

(75) Inventors: John G Hildebrand, Philadelphia, PA (US); Francisco Gonzalez, Atlanta, GA (US); James Fahrny, Parker, CO (US); Joshua Seiden, Englewood, CO (US)

(73) Assignee: NGNA, LLC, Denver, CO (US)

( * ) Notice: Subject to any disclaimer, the term of this patent is extended or adjusted under 35 U.S.C. 154(b) by 125 days.

(21) Appl. No.: 10/597,574

(22) PCT Filed: Jan. 31, 2005

(86) PCT No.: PCT/US2005/002623
§ 371 (c)(1), (2), (4) Date: Oct. 28, 2007

(87) PCT Pub. No.: WO2005/072389
PCT Pub. Date: Aug. 11, 2005

(65) Prior Publication Data
US 2008/0263623 A1    Oct. 23, 2008

Related U.S. Application Data

(60) Provisional application No. 60/540,161, filed on Jan. 29, 2004, provisional application No. 60/598,241, filed on Aug. 3, 2004.

(51) Int. Cl.
*H04N 7/16* (2011.01)

(52) U.S. Cl.
USPC ............................. 725/152; 725/6; 725/132

(58) Field of Classification Search
USPC .......................................................... 725/82
See application file for complete search history.

(56) References Cited

U.S. PATENT DOCUMENTS

| | | | |
|---|---|---|---|
| 5,757,909 A * | 5/1998 | Park .............................. | 380/201 |
| 5,781,910 A | 7/1998 | Gostanian et al. | |
| 5,909,257 A | 6/1999 | Ohishi et al. | |
| 6,088,451 A | 7/2000 | He et al. | |
| 6,130,898 A | 10/2000 | Kostreski et al. | |
| 6,201,536 B1 | 3/2001 | Hendricks et al. | |
| 6,275,496 B1 | 8/2001 | Burns et al. | |
| 6,397,000 B1 | 5/2002 | Hatanaka et al. | |
| 6,463,454 B1 | 10/2002 | Lumelsky et al. | |
| 6,481,012 B1 | 11/2002 | Gordon et al. | |
| 6,539,545 B1 | 3/2003 | Dureau et al. | |
| 6,567,127 B1 * | 5/2003 | Orr et al. ....................... | 348/478 |
| RE38,236 E * | 8/2003 | Kubota et al. .................. | 380/45 |

(Continued)

FOREIGN PATENT DOCUMENTS

| | | |
|---|---|---|
| JP | 06-295304 | 10/1994 |
| JP | 2000-076332 | 3/2000 |

(Continued)

OTHER PUBLICATIONS

International Search Report, WO 2005/072389, dated Sep. 2, 2005.

(Continued)

*Primary Examiner* — Cai Chen
(74) *Attorney, Agent, or Firm* — Banner & Witcoff, Ltd.

(57) ABSTRACT

A method and system of supporting operation of customer equipment in systems having at least a portion of their signals being transported according to standards which are not supported by the customer equipment.

20 Claims, 1 Drawing Sheet

(56) References Cited

U.S. PATENT DOCUMENTS

| | | | |
|---|---|---|---|
| 6,637,029 B1 | 10/2003 | Maissel et al. | |
| 6,813,643 B2 | 11/2004 | Perlman | |
| 6,876,852 B1 | 4/2005 | Li et al. | |
| 6,886,178 B1* | 4/2005 | Mao et al. | 725/52 |
| 6,968,394 B1 | 11/2005 | El-Rafie | |
| 6,981,045 B1* | 12/2005 | Brooks | 709/226 |
| 7,073,187 B1* | 7/2006 | Hendricks et al. | 725/36 |
| 7,219,367 B2 | 5/2007 | Briggs | |
| 7,228,555 B2 | 6/2007 | Schlack | |
| 7,339,954 B2 | 3/2008 | Futamata | |
| 7,376,829 B2 | 5/2008 | Ranjan | |
| 7,451,475 B1 | 11/2008 | Oz et al. | |
| 7,801,119 B2 | 9/2010 | Sorenson et al. | |
| 2001/0019559 A1 | 9/2001 | Handler et al. | |
| 2002/0031120 A1 | 3/2002 | Rakib | |
| 2002/0046406 A1 | 4/2002 | Chelehmal et al. | |
| 2002/0069420 A1 | 6/2002 | Russell et al. | |
| 2002/0075954 A1* | 6/2002 | Vince | 375/240.01 |
| 2002/0091771 A1* | 7/2002 | Agraharam et al. | 709/205 |
| 2002/0092021 A1* | 7/2002 | Yap et al. | 725/55 |
| 2002/0147978 A1 | 10/2002 | Dolgonos et al. | |
| 2002/0154691 A1* | 10/2002 | Kost et al. | 375/240.01 |
| 2002/0169823 A1* | 11/2002 | Coulombe et al. | 709/203 |
| 2002/0188732 A1 | 12/2002 | Buckman et al. | |
| 2002/0188958 A1 | 12/2002 | Miller | |
| 2002/0196939 A1* | 12/2002 | Unger et al. | 380/216 |
| 2003/0028643 A1* | 2/2003 | Jabri | 709/226 |
| 2003/0046686 A1* | 3/2003 | Candelore et al. | 725/31 |
| 2003/0058887 A1 | 3/2003 | Dworkin et al. | |
| 2003/0059047 A1* | 3/2003 | Iwamura | 380/201 |
| 2003/0088872 A1 | 5/2003 | Maissel et al. | |
| 2003/0126608 A1* | 7/2003 | Safadi et al. | 725/89 |
| 2003/0135860 A1* | 7/2003 | Dureau | 725/82 |
| 2003/0200548 A1 | 10/2003 | Baran et al. | |
| 2004/0049787 A1 | 3/2004 | Maissel et al. | |
| 2004/0153207 A1 | 8/2004 | Peck | |
| 2004/0179610 A1 | 9/2004 | Lu et al. | |
| 2004/0193712 A1 | 9/2004 | Benenati et al. | |
| 2005/0009519 A1* | 1/2005 | Murai et al. | 455/432.2 |
| 2005/0022253 A1* | 1/2005 | Chen et al. | 725/135 |
| 2005/0028206 A1 | 2/2005 | Cameron et al. | |
| 2005/0050218 A1 | 3/2005 | Sheldon | |
| 2005/0102297 A1 | 5/2005 | Lloyd et al. | |
| 2005/0123001 A1 | 6/2005 | Craven et al. | |
| 2005/0138669 A1 | 6/2005 | Baran | |
| 2005/0175178 A1* | 8/2005 | Candelore et al. | 380/201 |
| 2009/0138966 A1 | 5/2009 | Krause et al. | |

FOREIGN PATENT DOCUMENTS

| | | |
|---|---|---|
| JP | 2001-105351 | 12/2001 |
| JP | 2000-341430 | 5/2002 |
| JP | 2002-251530 | 9/2002 |
| JP | 2002-334227 | 11/2002 |
| JP | 2003-016286 | 1/2003 |
| JP | 2003-058717 | 2/2003 |
| JP | 2002-306331 | 8/2003 |
| JP | 2003-265865 | 9/2003 |
| JP | 2004187306 | 7/2004 |
| JP | 10-242961 | 9/2008 |
| WO | 0079801 | 12/2000 |
| WO | 0155877 | 8/2001 |
| WO | 03071727 | 8/2003 |

OTHER PUBLICATIONS

JP Office Action, 2006-551482, dated Feb. 8, 2011.
Supplementary European Search Report dated Dec. 7, 2011.
JP/OA 2006-551483 mailed Feb. 8, 2011.
Korean Patent Application No. 10-2006-7017243 Office Action mailed May 18, 2011.
JP/OA 2006-551483 dtd May 31, 2011.
Japanese Patent Application No. 2006-551482—Office Action dated Nov. 8, 2011.
Japanese Patent Application No. 2006-551483—Office Action dated Nov. 22, 2011.
Data-Over-Cable Service Interface Specifications, Interim Specification, SP-RFLv1.1-I07-010829, Aug. 29, 2001, Cable Television Laboratories.
Japanese Office Action JP 2006-551486, dated Mar. 5, 2012.
Japanese Office Action JP 2006-551486, dated Apr. 5, 2011.
The Delivery Layer in MPEG-4, G. Franceschini, Signal Processing. Image Communication, Elsevier Science Publishers, Amsterdam, NL, vol. 15, No. 4-5, Jan. 1, 2000.
Supplementary Partial European Search Report, EP 05712174, Dated Mar. 21, 2012.

* cited by examiner

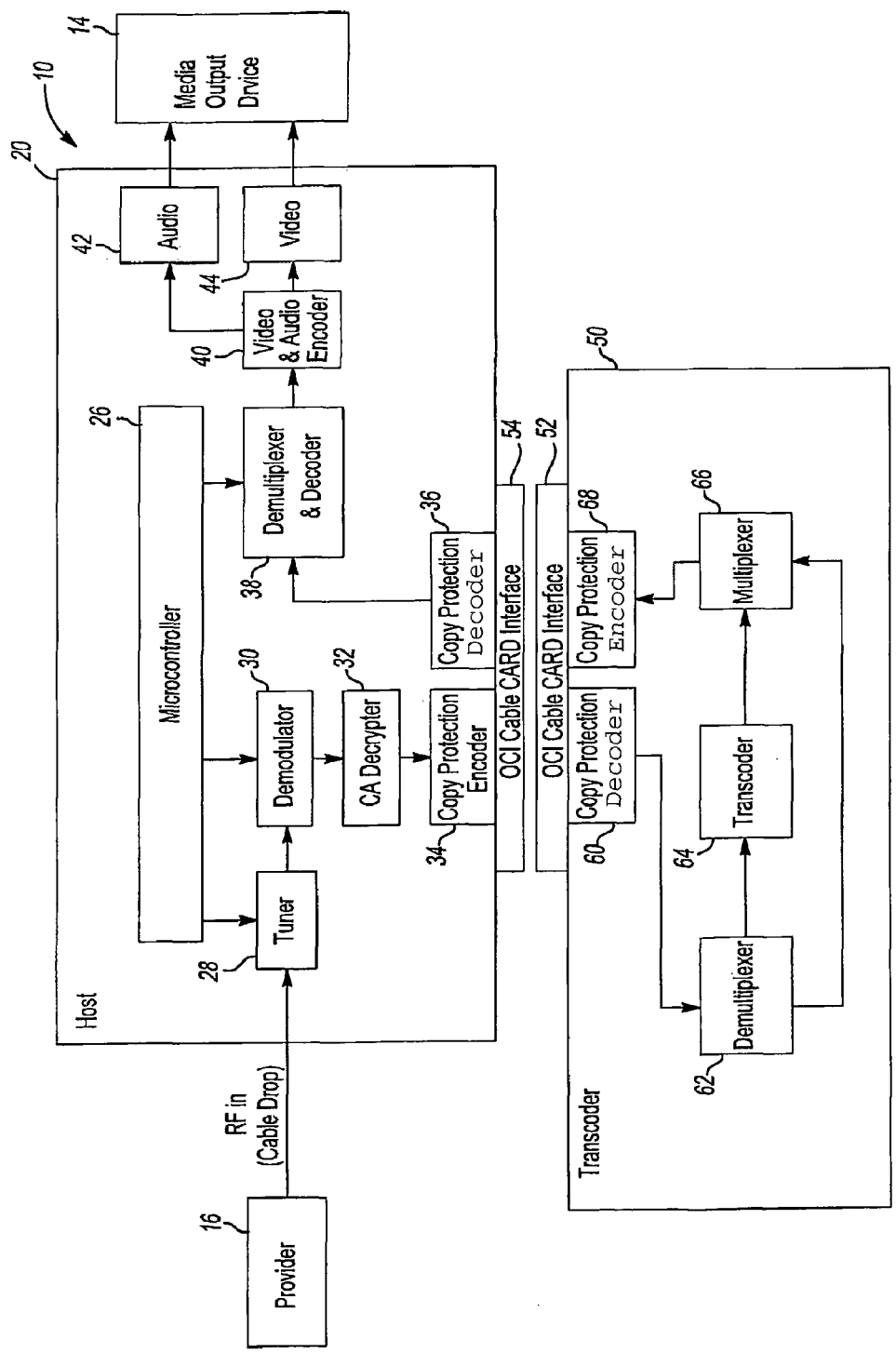

METHOD AND SYSTEM OF PROVIDING SIGNALS

CROSS-REFERENCE TO RELATED APPLICATIONS

This application claims the benefit of U.S. provisional application Ser. No. 60/540,161 filed Jan. 29, 2004 and U.S. provisional application Ser. No. 60/598,241 filed Aug. 3, 2004.

BACKGROUND OF THE INVENTION

1. Field of the Invention

The present invention relates to methods and system of providing digital signals for playback on media output devices.

2. Background Art

Some cable systems are running out of bandwidth as more channels are being supported and new services are being added, such as high definition television (HDTV) and video on demand (VOD). In compensation, new compression standards are being contemplated to alleviate bandwidth consumption.

Cable operators, however, typically desire to maximize the available capacity on their plants without having to deploy new settop boxes (STBs) or other customer equipment every time a new compression standard becomes available. This can be a problem in environments where legacy systems are unable to support new compression standards. For example, this problem can be found in legacy MPEG-2 STBs and other devices that incompatible with advanced video compression (AVC) standards, such as H.264 and MPEG-4.

Because legacy devices, such as those described above, have enormous popularity and low cost, cable operators face a dilemma with respect to balancing the desire of additional bandwidth consuming services against the cost of replacing legacy systems to support the additional services.

SUMMARY OF THE INVENTION

One non-limiting aspect of the present invention relates to supporting operation of customer equipment in systems having at least a portion of their signals being transported according to standards which are not supported by legacy customer equipment.

One non-limiting aspect of the present invention relates to a transcoding unit operable with the customer equipment to transcode signals to standards supported by the customer equipment. The present invention contemplates a number of configurations and features for the transcoding unit, including a card configured to insert within a slot of the customer equipment. For example, the signals may relate to digital television (DTV) signals or other signals compressed according to advance video compression (AVC) standards or other standards which are not supported by the customer equipment, such as one which only support MPEG-2 compression and other non-AVC standards. In accordance with one non-limiting aspect of the present invention, the transcoding unit may be inserted into a card slot of the legacy customer equipment to transcode the AVC or other signals not supported by the customer equipment to non-AVC or other signals supported by the customer equipment.

The transcoding unit may include any number of features for transcoding signals, including a demultiplexer for determining whether a transport stream includes the signals in payloads associated with protocols supported by the customer equipment or non-supported protocols. In one non-limiting aspect of the present invention, the demultiplexer is configured to transport non-supported payloads/packets associated with the non-supported protocols to a transcoder and supported payloads/packets to a multiplexer. The transcoder transcodes the payloads/packets associated with the non-supported protocols to supported payloads/packets and outputs the transcoded payloads/packets to the multiplexer. The multiplexer combines the transcoded payloads/packets (which were previously associated with non-supported protocols or standards) with the supported payloads/packets into a common transport stream for output to the customer equipment.

One non-limiting aspect of the present invention relates to a system of providing digital television or other signals to a media output device. The system may include a host configured to decode signals carried in payloads of a first payload type for playback on the media output device and a unit configured for transcoding digital television signals carried in payloads of a second payload type to the first payload type so as to permit the transcode payloads to be outputted to the host for playback.

One non-limiting aspect of the present invention relates to a method of transcoding dissimilar payloads carried in a first transport stream. The method may include demultiplexing the first transport stream to recover first and second payloads, transcoding the second payload to a protocol associated with the first payload if a protocol associated with the second payload is dissimilar from the protocol associated with the first payload, and multiplexing the first payload and the transcoded second payload to a second transport stream.

The method may further include associating the first payload with MPEG-2 protocols and associating the second payload with AVC protocols such the second payload is transcoded to MPEG-2 protocols.

The method may further include decrypting conditional access (CA) encryption of the first transport stream prior to demultiplexing, and particularly, to decrypting the CA encryption of the first transport stream in a settop box (STB) and demultiplexing, transcoding, and multiplexing the first and second payloads in a card inserted into a card slot of the STB.

The above features and advantages, along with other features and advantages of the present invention, are readily apparent from the following detailed description of the invention when taken in connection with the accompanying drawings.

BRIEF DESCRIPTION OF THE DRAWINGS

FIG. 1 illustrates a system of providing signals to a media output device in accordance with one non-limiting aspect of the present invention.

DETAILED DESCRIPTION OF THE PREFERRED EMBODIMENT(S)

FIG. 1 illustrates a system 10 of providing signals to a media output device 14 in accordance with one non-limiting aspect of the present invention. The system generally relates to a cable system where a provider 16 transmits signals over a cable or other transmission medium to media output devices 14 of its customers. Of course, the present invention contemplates other applications and is not intended to be limited to cable systems.

The present invention contemplates any number of features and configurations for the system 10 and is not intended to be limited to the features shown in FIG. 1. In particular, the present invention contemplates the communication of signals from the provider 16 to the media output devices 14 through any number of communication mediums other than cable, such as through wireless, satellite, fiber-optic, and other transmission mediums. Moreover, the present invention contemplates the transmission of any number of signals other than DTV signals (audio and video), including multimedia or data signals.

In accordance with one non-limiting aspect of the present invention, a host 20 may be provided to manipulate signals from the provider 16 to signals suitable for playback on the media output device 14. The host 20 may be a settop box (STB) or other customer equipment configured to output signals to a television or similar media output device 14, such as an audio unit, computer, or the like. In particular, the host 20 may be a digital video recorder (DVR), media terminal adapter (MTA), outlet digital adapter (ODE), or any other unit configured for manipulating non-supported signals received from the provider 16 to signals supported by the media output device 14.

The host 20 may include any number of features and components for manipulating the signals received from the provider 16. In particular, the host 20 may include a microcontroller 26, a tuner 28, a demodulator 30, a conditional access (CA) decrypted 32, a copy protection encoder 34, a copy protection decoder 36, a demultiplexer and decoder 38, a video and audio encoder 40, an audio port 42, and a video port 44.

In accordance with one non-limiting aspect of the present invention, the system 10 may include a transcoding unit 50 generally configured for transcoding non-supported signals to supported signals. In particular, one non-limiting aspect of the present invention relates to transcoding signals associated with AVC standards, such as MPEG4 and H.264, to signals operable with legacy customer equipment (i.e. customer equipment that only support MPEG-2, MPEG-1, MPEG-1.5 or other legacy compressive standards—many of which are characterized as being less compressive than the AVC standards). In this manner, the transcoding unit 50 may be used with legacy STBs, DVDs, or other types of customer equipment to support playback of transcoded signals on legacy systems, thereby permitting cable operators to utilize legacy customer equipment with newer non-supported standards and protocols.

In accordance with one non-limiting aspect of the present invention, the transcoding unit 50 may be a plug-and-play type device having an interface 52 configured for connecting to the host 20 through an interface 54, such as a CableCard type device that inserts into an open cable interface (OCI) CableCard interface (slot) of the host 20. Advantageously, the plug-and-play nature of the transcoding unit provides cable operators with a cost effective and practicable measure of supporting non-supported standards on legacy equipment.

Of course, the present invention contemplates any number of configurations for the transcoding unit 50 and is not intended to be limited to a card type unit which plugs or otherwise inserts into the host 20. In particular, the present invention contemplates the transcoding unit 50 being embedded on or otherwise included within the host 20, such as by being added to recycled customer equipment or configured to broadcast transcoded signals thereto, such as through a cable or wireless link.

The transcoding unit 50 may include any number of features and components for supporting the transcoding of signals from one protocol or standard of another. In more detail, the transcoding unit 50 may include a copy protection decoder 60, a demultiplexer 62, a transcoder 64, a multiplexer 66, and a copy protection encoder 68.

In operation, the provider 16, for example, may pocketsize digital television (DTV) or other signals into packets (headers, payloads, etc.) which are carried over a transport stream to the host 20, such as in an MPEG-2 transport stream. The signals are received by the tuner 28 and relayed to the demodulator 30 according to instructions received from the microcontroller 26.

Typically, the microcontroller 26 instructs the tuner 28 to select one or more channels from the incoming signals and then instructs the demodulator 30 to synchronize with and demodulate the one or more tuner selected channels for output to the CA decrypted 32. In particular, the tuner 28 may be configured to select a CAT 6 MHz RF carrier in a band between 52 an 1002 MHz and to output the tuned to signals td the demodulator 28 for demodulation of quadrate amplitude modulated signals.

The CA decrypted 32 decrypts the conditional access security added by the provider 16 to secure transmission of the signals. The onboard CA decrypted 32 is advantageous as it provides a feature integrated into the customer device. The CA decrypted signals are outputted to the copy protection encoder 34 for copy protection encoding so as to protect the transfer thereof to the transcoding unit 50.

The copy protection decoder 60 of the transcoding unit 50 decodes the copy protection imparted by the host 20 and outputs the transport stream to the demultiplexer 62. The demultiplexer 62 analyzes payload and/or packet types of the signals carried by the transport stream and determines whether to transport the associated payloads to the transcoder 64 or to bypass the transcoder 64 and transport the associated payloads to the multiplexer 66.

In accordance with one non-limiting aspect of the present invention, payloads of the type associated with non-supported standards (i.e. AVC, MPEG-4, etc) are transferred to the transcoder 64 for transcoding to supported payloads whereas supported payloads bypass the transcoder 64. In more detail, one non-limiting aspect of the present invention relates to supporting AVC standards on legacy STBs such that the transcoder 64 must be configured to transcode the AVC standards (i.e. MPEG-4, H.264, etc.) to the legacy standards associated with the host (i.e. MPEG-2). In this manner, the transcoder 64 may be configured to transcode one or more types of payloads to a common payload associated with the host 20.

The transcoded payloads are outputted from the transcoder 64 to the multiplexer 66 to be remultiplexed with the bypassed payloads (i.e. those supported by the host). The multiplexer 66 remultiplexes the transcoded payloads and non-transcoded payloads to a transport stream. The remultiplexed signals are outputted to the copy protection encoder 68 for copy protection encoding and output to the host 20.

The signals outputted from the transcoding unit 50, which now include only payload types operable with the host 20, are decoded by the copy protection decoder 36 and outputted to the demultiplexer and decoder 38 where the payloads are separated from the transport streams for recovery of the DTV or other signals associated therewith. The microcontroller 26 reads control and message information included within the transport stream for use in selecting the appropriate video and audio packets that constitute the program(s) selected by the user, such as through a remote control channel selection, EPG channel selection, VOD program selection, DVR playback selection, and the like. The signals are outputted to the video and audio encoder 40 for encoding into video and audio output signals and delivered to respective audio and video ports 42-44 for communication to the media output device.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
    demultiplexing a first digital transport stream to recover first and second digital payloads that were each carried in the first digital transport stream prior to said demultiplexing;
    transporting the second digital payload to a transcoder upon determining that a protocol in which the second digital payload is formatted is not in a set of one or more supported protocols;
    bypassing the transcoder and transporting the first digital payload to a multiplexer upon determining that a protocol in which the first digital payload is formatted is in the set of one or more supported protocols;
    transcoding, at the transcoder, the second digital payload to be formatted in the protocol in which the first digital payload is formatted; and
    multiplexing, at the multiplexer, the first digital payload and the transcoded second digital payload to create a second digital transport stream.

2. The method of claim 1 wherein the protocol in which the first digital payload is formatted is older than the protocol in which the second digital payload is formatted, and the second digital payload is transcoded to the protocol in which the first digital payload is formatted.

3. The method of claim 1 wherein the protocol in which the first digital payload is formatted is less compressive than the protocol in which the second digital payload is formatted, and the second digital payload is transcoded to the protocol in which the first digital payload is formatted.

4. The method of claim 1 further comprising decrypting conditional access (CA) encryption of the first digital transport stream prior to said demultiplexing.

5. The method claim 4, wherein decrypting the CA encryption of the first digital transport stream is performed in a settop box (STB).

6. The method of claim 1 wherein the steps of demultiplexing the first digital transport stream, transcoding the second digital payload, and multiplexing the first and transcoded second digital payloads occur in a card inserted into a card slot of a first interface device.

7. The method of claim 6 further comprising decoding copy protection of the first digital transport stream in the card and prior to said demultiplexing, transcoding, and multiplexing.

8. The method of claim 7 further comprising encoding copy protection to the second digital transport stream.

9. The method of claim 8 further comprising transmitting the copy protection encoded second digital transport stream from the card to the first interface device.

10. A method, comprising:
    receiving, at a device, a first digital transport stream that contains first digital payloads that are each formatted in a first protocol and second digital payloads that are each formatted in a second protocol, wherein the first digital payloads and the second digital payloads are multiplexed together in the first digital transport stream;
    demultiplexing, at the device, the first digital transport stream to recover the first digital payloads and the second digital payloads;
    analyzing the first digital payloads and the second digital payloads to determine that the first protocol is dissimilar from the second protocol;
    selecting, dependent upon the first protocol's association with the first digital payloads, the first protocol for use when transcoding the second digital payloads;
    transcoding each of the second digital payloads to produce transcoded second digital payloads that are each formatted in the first protocol; and
    multiplexing the first digital payloads with the transcoded second digital payloads to create a second digital transport stream.

11. The method of claim 10, further comprising:
    prior to said demultiplexing, decoding the first digital transport stream to remove copy protection; and
    after multiplexing, encoding the second digital transport stream to add copy protection.

12. The method of claim 11, further comprising:
    prior to said demultiplexing and prior to said decoding, encoding the first digital transport stream to add copy protection;
    after multiplexing and after encoding the second digital transport stream, decoding the second digital transport stream to remove copy protection; and
    after decoding the second digital transport stream, demultiplexing the second digital transport stream to recover the first and transcoded second digital payloads.

13. An apparatus, comprising:
    a first demultiplexor configured to demultiplex a first digital transport stream to recover first digital payloads that are each formatted in a first protocol and second digital payloads that are each formatted in a second protocol that is different from the first protocol, wherein the first digital payloads and the second digital payloads were multiplexed together in the first digital transport stream prior to said demultiplexing;
    a transcoder configured to transcode each of the second digital payloads to be formatted in the first protocol, wherein the first protocol is selected for use when transcoding the second digital payloads dependent upon the first protocol's association with the first digital payloads; and
    a multiplexor configured to multiplex the first digital payloads with the transcoded second digital payloads to create a second digital transport stream.

14. The apparatus of claim 13, further comprising:
    a first copy protection decoder configured to decode the first digital transport stream to remove copy protection; and
    a first copy protection encoder configured to encode the second digital transport stream received from the multiplexor to add copy protection.

15. The apparatus of claim 14, further comprising:
    a second copy protection encoder configured to encode the first digital transport stream to add copy protection and transmit it to the first copy protection decoder;
    a second copy protection decoder configured to decode the second digital transport stream received from the first copy protection encoder, so as to remove copy protection; and
    a second demultiplexor configured to demultiplex the second digital transport stream received from the second copy protection decoder, to separate the first digital payloads from the transcoded second digital payloads.

16. The apparatus of claim 13, wherein the demultiplexor, the transcoder, and the multiplexor are on a first hardware module that is configured to be inserted into a receiver device that is configured to decode digital payloads formatted in the first protocol.

17. The apparatus of claim 14, wherein the demultiplexor, the transcoder, the multiplexor, the first copy protection encoder, and the first copy protection decoder are on a first hardware module that is configured to be inserted into a second hardware module that is configured to decode digital payloads formatted in the first protocol.

18. The apparatus of claim 15, wherein the demultiplexor, the transcoder, the multiplexor, the first copy protection encoder, and the first copy protection decoder are on a first hardware module that is configured to communicate with a second hardware module that contains the second copy protection encoder, the second copy protection decoder, and the second demultiplexor.

19. The method of claim 10, further comprising transmitting the second digital transport stream to a device that is configured to receive digital transport streams containing digital payloads formatted in the first protocol.

20. The method of claim 1 further comprising:
   analyzing the first digital payload to identify the protocol in which the first digital payload is formatted;
   wherein transcoding the second digital payload is dependent upon identifying the protocol in which the first digital payload is formatted.

\* \* \* \* \*

UNITED STATES PATENT AND TRADEMARK OFFICE
CERTIFICATE OF CORRECTION

PATENT NO.         : 8,505,064 B2                                Page 1 of 2
APPLICATION NO.    : 10/597574
DATED              : August 6, 2013
INVENTOR(S)        : John G. Hildebrand et al.

It is certified that error appears in the above-identified patent and that said Letters Patent is hereby corrected as shown below:

Title Page, (75) Inventors, Line 1:
    Delete "Philadelphia, PA" and insert --Lawrenceville, GA--

In the Specification:
Column 3, Line 18:
    Delete "ODE" and insert --ODA--

Column 3, Line 26:
    Delete "decrypted" and insert --decrypter--

Column 3, Detailed Description Of The Preferred Embodiment(s), Line 41:
    Delete "DVDs," and insert --DVRs,--

Column 4, Detailed Description Of The Preferred Embodiment(s), Line 3:
    Delete "pocketsize" and insert --packetize--

Column 4, Detailed Description Of The Preferred Embodiment(s), Line 15:
    Delete "decrypted" and insert --decrypter--

Column 4, Detailed Description Of The Preferred Embodiment(s), Line 16:
    Delete "CAT" and insert --CATV--

Column 4, Detailed Description Of The Preferred Embodiment(s), Line 17:
    Delete "td" and insert --to--

Column 4, Detailed Description Of The Preferred Embodiment(s), Line 18:
    Delete "28" and insert --30--

Signed and Sealed this
Twenty-first Day of July, 2015

Michelle K. Lee
*Director of the United States Patent and Trademark Office*

CERTIFICATE OF CORRECTION (continued)
U.S. Pat. No. 8,505,064 B2

Column 4, Detailed Description Of The Preferred Embodiment(s), Line 18:
    Delete "quadrate" and insert --quadrature--

Column 4, Detailed Description Of The Preferred Embodiment(s), Line 20:
    Delete "decrypted" and insert --decrypter--

Column 4, Detailed Description Of The Preferred Embodiment(s), Line 22:
    Delete "decrypted" and insert --decrypter--

UNITED STATES PATENT AND TRADEMARK OFFICE
CERTIFICATE OF CORRECTION

PATENT NO.        : 8,505,064 B2                                                Page 1 of 1
APPLICATION NO.   : 10/597574
DATED             : August 6, 2013
INVENTOR(S)       : Hildebrand et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 554 days.

Signed and Sealed this

Fifteenth Day of September, 2015

Michelle K. Lee
*Director of the United States Patent and Trademark Office*